United States Patent [19]
Anglea et al.

[11] Patent Number: 5,680,627
[45] Date of Patent: Oct. 21, 1997

[54] METHOD AND APPARATUS FOR CHARACTER PREPROCESSING WHICH TRANSLATES TEXTUAL DESCRIPTION INTO NUMERIC FORM FOR INPUT TO A NEURAL NETWORK

[75] Inventors: Billy W. Anglea; Robert Charles Cox, both of Round Rock, Tex.

[73] Assignee: Texas Instruments Incorporated, Dallas, Tex.

[21] Appl. No.: 656,883

[22] Filed: Feb. 15, 1991

[51] Int. Cl.$^6$ .................................................. G06F 17/20
[52] U.S. Cl. .................................. 395/751; 395/20
[58] Field of Search ........................... 364/419; 395/144, 395/145, 22, 23

[56] References Cited

U.S. PATENT DOCUMENTS

| | | | |
|---|---|---|---|
| 4,802,103 | 1/1989 | Faggin et al. | 364/513 |
| 4,803,736 | 2/1989 | Grossberg et al. | 382/22 |
| 4,918,618 | 4/1990 | Tomlinson, Jr. | 364/513 |
| 5,048,097 | 9/1991 | Gaborski et al. | 382/14 |

OTHER PUBLICATIONS

"Cryptology," *The New Encyclopedia Britannica: Macropodia*, Chicago, IL; Fifteenth Edition, 1989, vol. 16, p. 869.

Hinton and Sejnowski, "Learning and Relearning in Boltzmann Machines," vol. 1: *Foundations, Parallel Distribution Processing: Explorations in the Microstructure of Cognition*, Cambridge, MA: MIT Press, 1986.

Rumelhart, Hinton and Williams, "Learning Internal Representations by Error Propagation", vol. 1, *Foundations, Parallel Distributed Processing: Explorations in Microstructure of Cognition*, Cambridge, MA: MIT Press, 1986.

Le Cun et al; Handwritten Digit Recognition Applications Of Neural Network Chips And Automatic Learning; Nov., 1989;pp.41–46.

*Primary Examiner*—Gail O. Hayes
*Assistant Examiner*—Krishna V. Kalidindi
*Attorney, Agent, or Firm*—W. Daniel Swayze, Jr.; W. James Brady, III; Richard L. Donaldson

[57] ABSTRACT

A preprocessor translates problem descriptions in text format to a numeric form, usable by a neural network. Problem descriptions and associated solutions are used as training sets for the neural network. From a word domain collected from a number of problem descriptions, each character used in the problem domain is assigned a character frequency value. These frequency values are used to translate each problem description to an input vector, where each input value represents a character and each input value is associated with an input node of the neural network. In addition to being associated with a frequency value, each character is scaled and normalized to improve accuracy of the neural network's recall capabilities.

31 Claims, 5 Drawing Sheets

METHOD AND APPARATUS FOR CHARACTER PREPROCESSING WHICH TRANSLATES TEXTUAL DESCRIPTION INTO NUMERIC FORM FOR INPUT TO A NEURAL NETWORK

TECHNICAL FIELD OF THE INVENTION

This invention relates to neural network processing, and more particularly to a method for using neural networks to resolve problem descriptions stated in textual form.

BACKGROUND OF THE INVENTION

Artificial neural networks are designed to mimic the characteristics of biological neurons and synapses. Systems of neural networks are useful for applications such as associative searches, pattern recognition, classification, and optimization of fuzzy, incomplete, or unpredictable data.

To implement an artificial neural network, a set of inputs is applied to a neural element. Each input is multiplied by a weight, which is analogous to a synaptic strength. The weighted inputs are then summed by the neural element to provide an output, which represents the neuron's activation level.

At the system level, numerous neural elements may be interconnected. Systems of neural networks may have many layers of neural elements, with the complexity of the system being a function of the number of layers and their interconnections.

A simple model of a neural network uses a matrix of interconnections, each associated with a synapse element, to provide inputs to a layer of neural elements. Each neural element outputs a weighted sum of the inputs to the matrix. The output equation, $N=X_i W_{ij}$, indicates that the output is a vector of values, N, obtained by multiplying a vector of input values, X, times a matrix of weighting values, W. The N vector may be further processed by an activation function to produce an output vector, O.

Various methods of implementing a neural network include simulation on digital computing equipment, using an optical network, and using an analog electrical circuit.

A disadvantage of neural networks is that their inputs are numeric. Yet, for many problem solving applications, the problem definitions are alphanumeric. A need exists for a method of responding to textual problem definitions.

One approach would be to use an input processing element for each possible word. However, the number of words used in most practical problem domains and the extent of training that would be required, makes this approach prohibitive.

SUMMARY OF THE INVENTION

One aspect of the invention is a method for providing input, representing an alphanumeric problem description, to a neural network. A word domain, consisting of words constructed from a defined character set, is collected from a number of problem descriptions. The number of characters in the word domain is counted. The numbers of each character in the domain are counted. The number of each character is divided by the total number of characters, to obtain a character frequency value for each character. These frequency values are used to determine an input value for each character of a problem description.

More specifically, the input values are determined by removing character biases to obtain a scaled value for each character. The number of occurrences of a character in a problem description is multiplied times its character frequency, and this product is subtracted from the total number of characters in the problem description. This calculation scales each character and gives it a value that is distributed around a zero value. The character values are also normalized by dividing each of the scaled values by the standard deviation of all of the scaled values within the problem description.

Enhancements of the invention include filtering the word domain to distinguish high value words. This can be achieved by comparing words of the word domain to a dictionary of words not to be used or to a dictionary of words to be used, or both.

Other aspects of the invention include methods of training a neural network to recall input in text form, and methods of using a neural network to resolve problem descriptions stated in text format. Also, system aspects of the invention include a filter preprocessor programmed to refine the problem description to a string of high value words, a character preprocessor programmed to accomplish character translation, and a neural network for operating on the filtered and translated problem string. A number of neural networks can be used in a comprehensive problem solving system, where secondary neural networks resolve subproblems, such as problem type characterization and spelling correction.

A technical advantage of the invention is that it provides a means for using neural networks to resolve problem descriptions that are stated in textual format. The invention may be used to provide an expert system that predicts solutions based on a history of textual solutions, without the need to develop the rules and knowledge base required for conventional expert systems.

The invention is adaptive in that it permits textual input that may be at times incomplete or inaccurate. The invention may be easily retrained to improve its accuracy and scope.

DETAILED DESCRIPTION OF THE INVENTION

Figure 1:
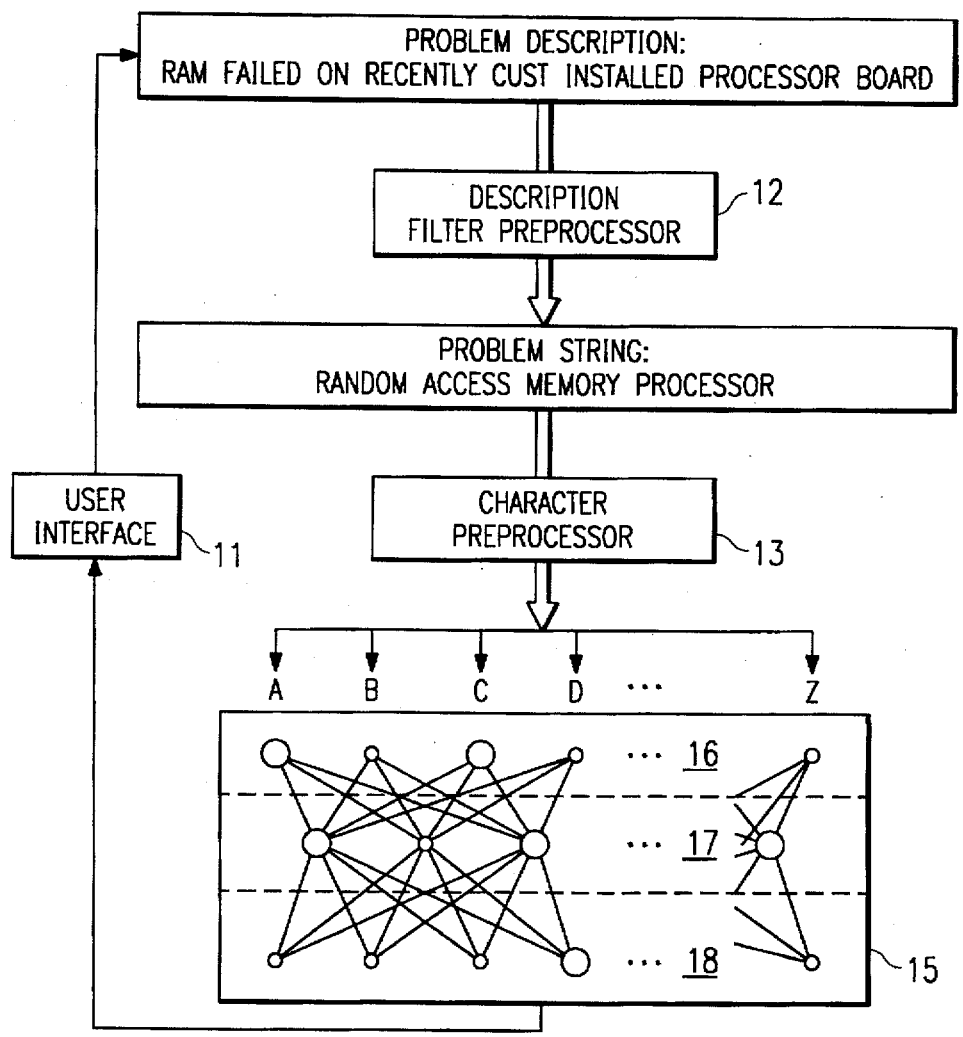
FIG. 1 illustrates the processing of a problem description.

In general, the invention is useful for any problem solving application, where a problem is most conveniently described in terms of text rather than numerals, and where historical data is available to provide training sets of problem descriptions and solutions. For purposes of example, the following specification of the invention is in terms of a method of using a neural network for computer repair applications. Problems are presented in terms of requests for service. The invention is used to predict the corrective action required for a service request, such as the parts required to repair faulty hardware.

The neural network with which the invention is used may be any one of a number of well known neural network configurations, either software or hardware. In the more standard embodiments of the invention, the neural network is implemented on a microcomputer, executing a commercially available neural network software package.

For purposes of this description, the "problem description" is a set of words and phrases that describe a particular problem. Semantics of problem descriptions are implied by narrow context, which includes words and phrases, both referred to collectively herein as words. Semantics at the sentence level and above are ignored. For example, a problem description may be stated as "can't boot", "disk is screeching", or "disk fails to boot up the software".

Handling semantics at the word level includes assigning values to specific words, recognizing differences between high value words, and disposition of words based on value. Word values are determined during training in accordance with the correlation of the word to a desired output.

In the example problem descriptions above, the high value words are "disk" and "boot" because they are associated with a certain repair part. The low value words, such as "the", "is", "fails", "to", "up", and "can't", are filtered out of the problem description. Words of questionable value, such as "screeching" and "software" may be sent to the neural network if valuable to other parts or filtered out if not valuable.

High value words are distinguished from each other by their features. These features include unique characters, the number of each unique character, and the position of each unique characters.

During both training and practical applications of the neural network, problem descriptions are converted to numeric input, using a character frequency analysis. The neural network is set up by assigning each character to an input processing element, referred to herein as an "input node" of the neural network. Thus, for a 26 letter alphabet, the neural network has 26 input nodes. A value is assigned to each node, according to the number of characters in the problem description and associated with that processing element. Also, certain characters have more impact than others. For example, a "Z" has more impact than an "E". In general, the less frequently a letter is used, the more impact it has.

To determine character frequencies, a word domain, constructed from a defined character set, is collected. In the preferred embodiment, the word domain is obtained from a historical collection of problem descriptions. Each character used in the word domain is assigned a character frequency value by first counting the number of times the character is used in the word domain and dividing that value by the total number of characters in the word domain. For example, if the character set is the letters A through Z and if the word domain has 1000 characters, and the letter A is used 25 times, the character frequency of A is 25/1000 or 0.025. In a similar manner, each character B through Z is assigned a frequency, such that the result is a table of frequency values, one value for each character.

The assignment of character frequencies may be refined by various filtering steps performed on the problem domain before character frequencies are calculated. For example, the problem domain can be compared to a "don't use" dictionary so that words that are not useful are eliminated. In addition, or alternatively, the problem domain can be compared to a "use" dictionary so that words that are known to be useful are kept. The result is a string of text extracted from a collection of problem descriptions. As explained below, ideally, the same "don't use" and "use" dictionaries are used during training and regular operation.

FIG. 1 illustrates the processing of a problem description, which occurs after character frequencies have been determined. FIG. 1 is sufficiently general to describe both initial training as well as operation during practical use. As explained below, practical use may involve additional steps, such as spelling correction and capture of results at various stages for retraining purposes.

In general, each problem description is filtered by a description filter preprocessor 12 to obtain a problem string. The problem string is converted to a set of input values, one value for each node, using character preprocessor 13. These input values are applied to the input nodes of a neural network 15.

The computer programming for the system of FIG. 1 may include a user interface 11, so that input and output can be interactively communicated between user and computer. The user interface 11, description filter preprocessor 12, and the character preprocessor 13 may be implemented with standard data processing equipment. The user interface 11 includes input means, such as a keyboard, and an output means, such as a display. As explained above, neural network 15 may be software-based computer processing equipment, or may be some other configuration.

Filter preprocessor 12 comprises a means for matching the words of the problem description to a "don't use" dictionary or a "use" dictionary, or to both. For the "don't use" dictionary, each word is compared to a table of words that have been determined to be of no value in resolving the problem. If the word matches a word in the "don't use" dictionary, the word is eliminated from the problem description. For the "use" dictionary, each word in the problem description, is compared to a table of words that have known value. If a word matches a word in the "use" dictionary, it is retained as part of the problem string. Both the "don't use" and the "use" dictionary may be implemented with standard computer equipment, programmed with any one of a number of matching algorithms.

As another part of the filtering process, duplicated words and white spaces are stripped from the problem description. Like the dictionary filtering, this part of the filtering process may also be accomplished with standard data processing equipment.

Character preprocessor 13 receives the problem string produced by filter preprocessor 12. Character preprocessor 13 is essentially a computer that executes an algorithm, which in general terms, converts text to numeric input, such that in addition to being assigned a frequency value, each character is scaled and normalized.

An algorithm for determining the value of each input node is:

$$\text{Input}_\alpha = (n_\alpha - (N \times f_\alpha))/(2 \times \sigma)$$

where $\alpha = A, B, C, \ldots Z$. The value, $N$, is the total number of characters in the problem description. The value, $n$, is the number of characters corresponding to the input node. The value, $f$, is the frequency of occurrence of the character in the training data. The value, $\sigma$, is the standard deviation of $n_\alpha - (N \times f_\alpha)$.

The numerator of the above algorithm, $(n_\alpha-(N \times f_\alpha))$, removes the bias of certain characters in the character set. For example, the English language has biases toward vowels. Removing these biases scales the input characters down and distributes them around a zero value. The denominator of the algorithm normalizes the input data. This normalization separates words into similar groups, which improves accuracy because members of a group tend to predict similar results.

Figure 2:
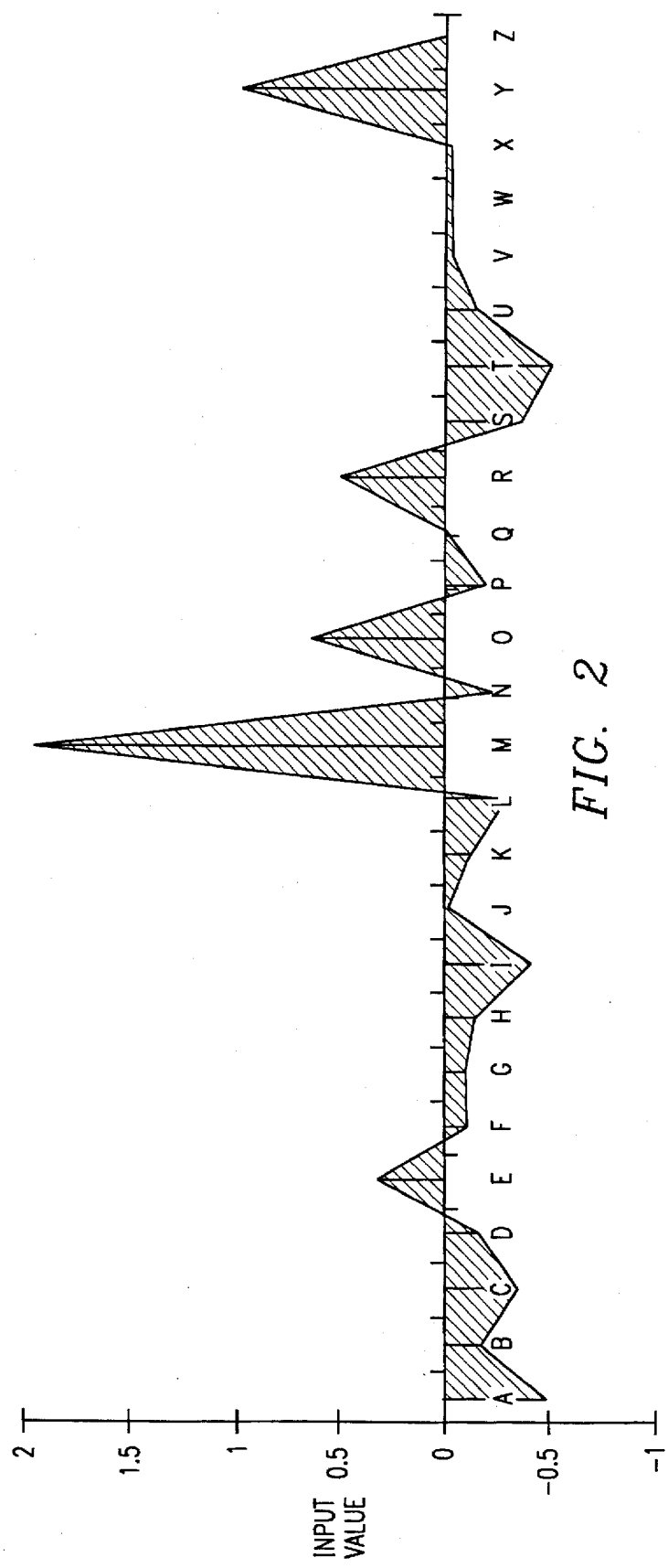
FIG. 2 illustrates an example of an input to a neural network, representing the word "memory".

FIG. 2 illustrates the input for a problem description, which for purposes of example, is one word, "memory". Each character has been scaled and normalized by character preprocessor 13. In this example, the problem domain used to determine character frequencies is a collection of technical terms, from which the frequencies of the characters A through Z were determined. For the word "memory", the letter A has n=0, thus Input$_A$ is less than 0. The letter M has n=2, thus Input$_B$ is greater than 0, and so on for each letter to Z. Each input has a magnitude that is a function of its frequency.

Figure 3:
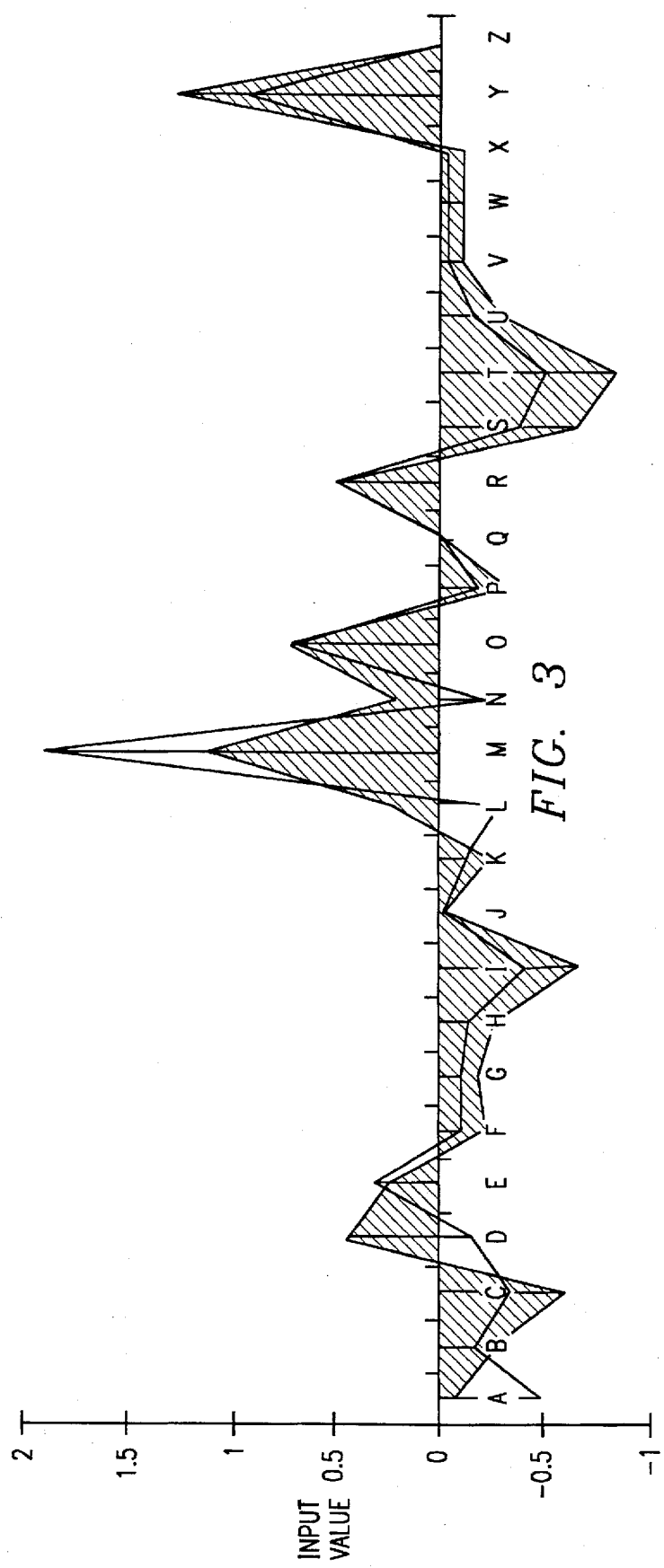
FIG. 3 illustrates two examples of inputs to a neural network, representing the word "memory" and the phrase "read only memory".

FIG. 3 illustrates the input for the phrase "read only memory", as compared to the input for "memory". The values representing "read only memory" are shaded, and the values for "memory" are outlined. FIG. 3 illustrates how, as a result of the above algorithm, equivalent words and phrases have similar inputs. The problem domain determines the weight that particular words or phrases will have and the tolerances that will permit similar words and phrases to be recalled. The words "read" and "only" have less significance than the word "memory" and therefore carry less weight.

Referring again to FIG. 1, the inputs generated by character preprocessor 13 are applied to neural network 15, which is multi-layered, having an input layer 16, at least one hidden layer 17, and an output layer 18. More specifically, inputs are applied to input nodes 16A–16Z.

Neural network 15 is then either trained to produce desired outputs at each output node 18a–18N, or, if already trained, is operated to recall problem descriptions. The number of output nodes is represented by N. There may be any number of output nodes depending on the size of the solution domain, and limited only by size constraints of neural network 15. Where neural network 15 is implemented as a software simulation, the limit on input and output nodes depends on real or virtual memory.

In the embodiment of this description, each output node of neural network 15 represents a pointer to a solution. More than one solution may be indicated, and the size of the output value will indicate a degree of certainty for each solution. A threshold can be set to limit the degree of certainty of solutions. This threshold may be subsequently adjusted to adjust the accuracy and generality of the invention's ability to predict solutions.

In an alternative embodiment, output layer 18 could be trained in a manner analogous to the construction of input layer 16. In this embodiment, each output node would represent a character of a textual solution.

Initial Training

In the preferred embodiment, neural network 15 is trained by using the paradigm of learning known as "back propagation". Other training algorithms may be used, with the selection of a particular algorithm being a matter of the accuracy and other suitability factors for a particular application.

Input layer 16 has a linear transfer function. Hidden layer 17 and output layer 18 have sigmoid transfer functions.

Figure 4:
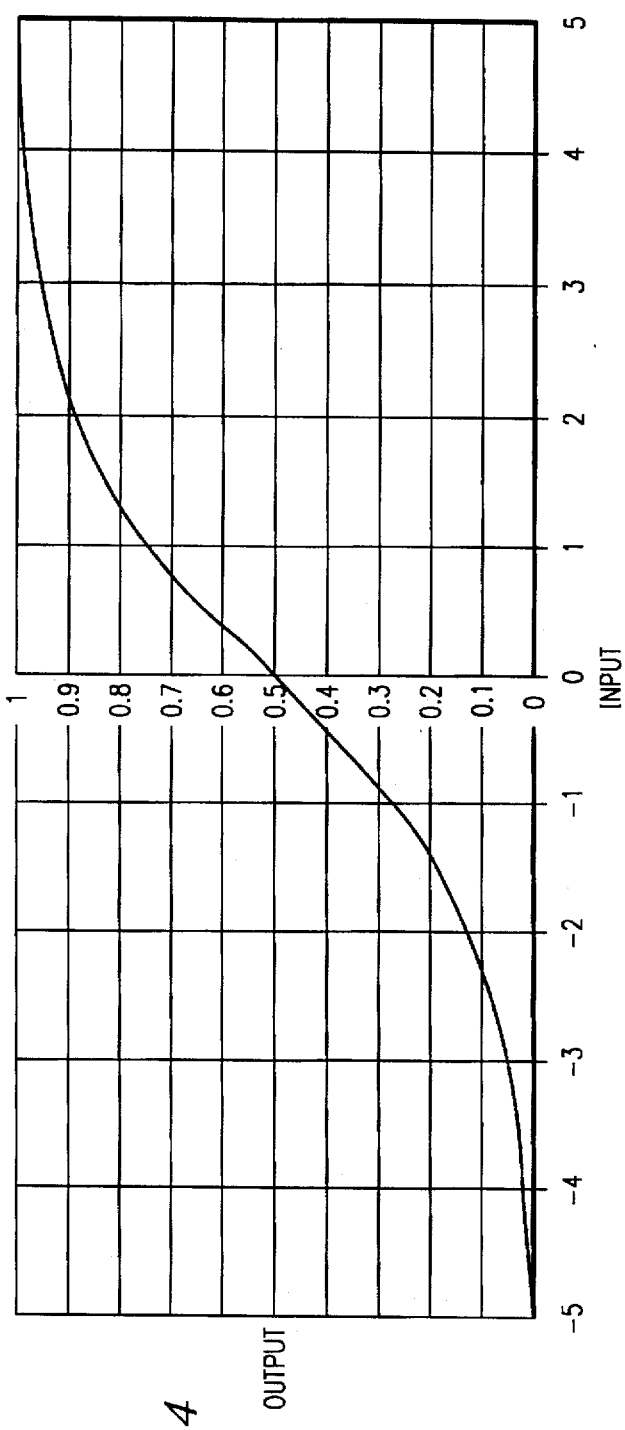
FIG. 4 illustrates the activation function of the neural network.

FIG. 4 illustrates the sigmoid transfer function used for training. Values greater than a predetermined value are not distinguishable. In FIG. 4, this cutoff value is 5.

Figure 5:
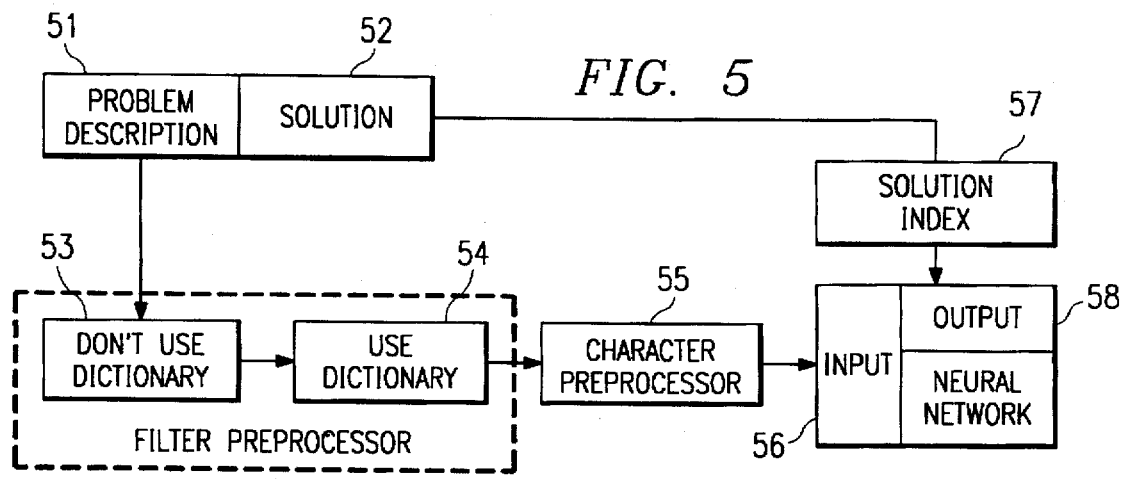
FIG. 5 illustrates the process of training a neural network.

FIG. 5 illustrates the initial training process, which occurs after a problem domain is used to determine character frequencies, as described above. As explained below, after initial training, and once practical use is begun, if desired, neural network 15 can be retrained to improve accuracy and increase the number of problems it is able to solve.

In steps 51 and 52, a problem description and a corresponding solution are obtained from historical data. The problem description and a solution are a training set, where the solution represents a "pattern" to be learned by the neural network 15.

Steps 53 and 54 are filtering steps, which involve the extraction of a problem string from a problem description, as described above in connection with the filter preprocessor 12 of FIG. 1. In step 53, the problem description is compared to a "don't use" dictionary. In step 54, the problem description is compared to a "use" dictionary.

In step 55, each character of the problem string is converted to an input value, as described above in connection with the character preprocessor 13 of FIG. 1. In step 56, these input values are applied to the input nodes 16A–16Z of neural network 15.

Step 57 is matching solutions to a numeric valued index, where each value of the index represents an output node 18a–18N of neural network 15.

Step 58 is applying the output values to output nodes 18a–18N of neural network 15. For training, the weights are randomized to some value plus or minus 0.1. Annealing and the learning coefficients are set up to decrease as training goes on and the network centers on the knowledge. This reduces the likelihood that the neural network will converge on a local minima.

Using known training techniques, the weights associated with internal neural network elements are adjusted until the input vector produces a desired output. In the example of this description, each problem description is matched to an output value that is an index to a particular solution needed to resolve the problem.

The invention accommodates the likelihood that a problem description may indicate more than one solution. Solutions can be defined as those output values that exceed a predetermined threshold. When one of several solutions is to be selected, neural network 15 may be trained to develop a certainty indicator for each solution, based on the number of times the network 15 is presented with the problem description having that solution. When a single problem description always has a multiple solution, the associated outputs can be trained to have identical values.

Practical Uses

Once the network has been initially trained, practical applications involve receiving and preprocessing problem descriptions for input to neural network 15, and using neural network 15 to recall a problem solution.

Figure 6:
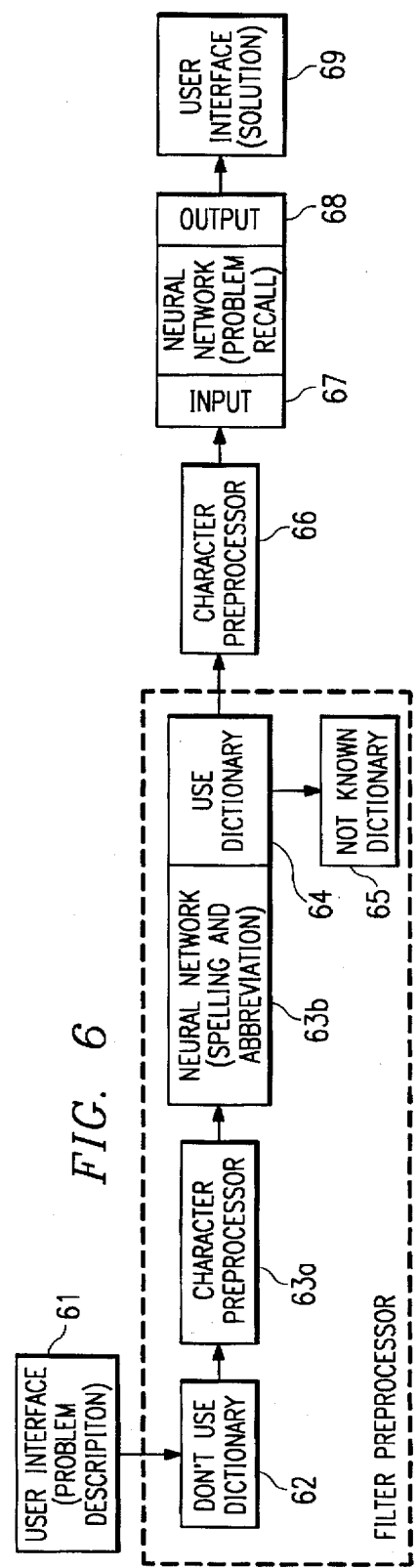
FIG. 6 illustrates the process of using the neural network in practical applications.

FIG. 6 illustrates the process of generating input and of using two neural networks 15 to solve a problem. Many of the steps are similar to those used in training, with an important distinction being that the process of FIG. 6 may be a real-time problem solving process.

Step 61 is receiving a problem description. Step 62 is comparing the problem description to a "don't use" dictionary.

Steps 63a and 64b involve another application of the invention, which solves a "subproblem", i.e., the correction of spelling and expansion of abbreviations in the problem description. Thus, in addition to predicting a solution from a problem description, the invention can be used to generate a more refined problem description. A neural network 15 is trained with a dictionary of correctly spelled words, with the characters of each word applied to an input node 16A–16Z and the words applied to output nodes 18a–18N. The same character frequency technique as described above is used for preprocessing the input. If the input word is misspelled, the neural network 15 recalls the correctly spelled word, and an output node corresponding to the correctly spelled word will fire. The misspelled portion of the word is analogous to noise on the input, which does not completely disguise the correct input.

The spell checking, steps 63a and 63b, can be performed at any time during the filtering phase. However, for efficiency, a list of potentially misspelled words can be obtained from those not recognized by either the "don't use" or the "use" dictionary.

Step 64 is comparing the problem description to a "use" dictionary. As explained above, words that do not match a word in the "use" dictionary are eliminated from the problem description.

Step 65 is collecting words that are not excluded by the "don't use" dictionary and not included by the "use" dictionary. These words comprise a "not known" dictionary, containing words that are potentially useful. This dictionary may be used to retrain and update the invention, in that words in this dictionary can be added to the "use" dictionary and the neural network 15 retrained to predict associated solutions. Only those words and phrases that are actually used, as opposed to the problem domain used for training, can comprise the "use" dictionary. Thus, the character frequencies and the predictive ability of the invention are enhanced.

The retraining process is automated so that it automatically occurs at regular intervals. Neural network 15 monitors its accuracy by looking at its past performance, as documented in history. It compares its prediction to what actually occurred, and is programmed to automatically retrain if its performance degrades to a point where it is not sufficiently accurate.

Step 66 is converting the problem string to numeric input in accordance with the character preprocessing technique described above in connection with FIG. 1. Step 67 is applying these input values to neural network 15.

Step 68 is using the neural network 15 to obtain output values and relating these output values to solutions. As explained above, solutions can be compared to a predetermined threshold to determine certainty. It is possible that the output might indicate that there is no known solution within a desired degree of certainty.

Repair Prediction

Figure 7:
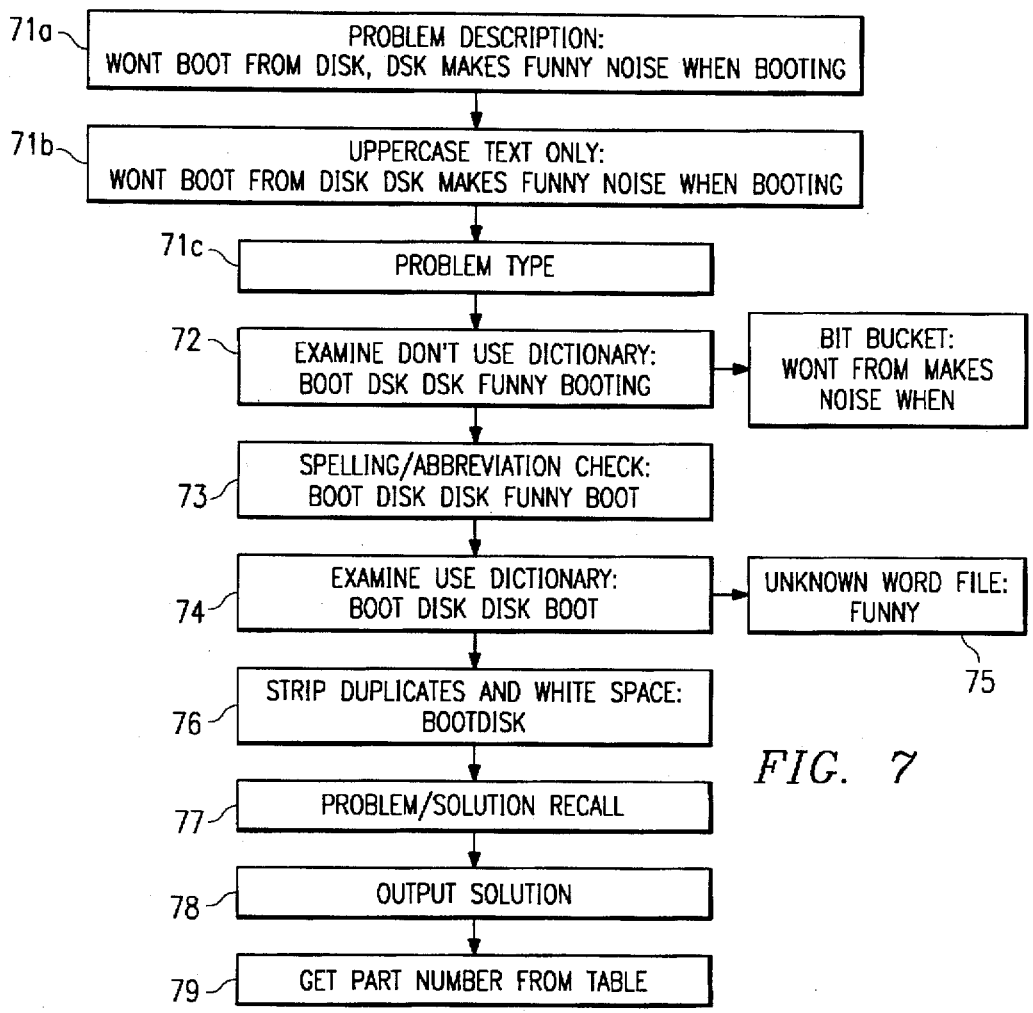
FIG. 7 illustrates an example of using the invention for a specific practical application.

FIG. 7 illustrates an example of a practical application of the invention, in which it predicts the repair needed for malfunctioning computer equipment. As explained below, more than one neural network 15, trained and used in accordance with the invention, are used. Steps 71c, 73, and 77 are each implemented with a character preprocessor 13 and a neural network 15.

Step 71a is receiving a problem solution expressed in written text. For purposes of example, a service request states the problem as follows: "won't boot from disk. dsk makes funny noise when booting".

In step 71b, the problem description is translated to upper case only. This step simplifies the neural network processing in that it avoids the need to distinguish upper and lower case letters.

In step 71c, the type of service call is categorized. A first neural network 15 is trained and used for this purpose. For example, one problem description might indicate a software solution, whereas another problem description might indicate a hardware solution. The neural network outputs correspond to the type of solution. Then, depending on the type of solution, the process of FIG. 7 might branch to a different subsystem. In this example, a hardware solution is indicated and the subsystem shown in the remainder of FIG. 7 is used.

Step 72 compares the words and phrases of the problem description to a "don't use" dictionary. As a result of this step, the problem description becomes "BOOT DISK DSK FUNNY BOOTING".

Step 73 corrects spelling and expands abbreviations. This step uses a second character preprocessor 13 and neural network 15, trained and used in accordance with the invention in the manner explained above. As a result of this step, the problem description becomes "BOOT DISK DISK FUNNY BOOT".

Step 73 compares the problem description to a "use" dictionary. In this example, the "use" dictionary generally represents technical terms. As a result of this step, the problem description becomes "BOOT DISK DISK BOOT". The word FUNNY, which is a word contained in neither the "don't use" nor the "use" dictionary, is stored in an unknown word file for retraining purposes.

In step 76, duplicate words and white space are stripped. The result is a problem string, "BOOTDISK".

In step 77, the neural network recalls the problem description and predicts a solution. This step uses a third character preprocessor 13 and neural network 15.

Figure 8:
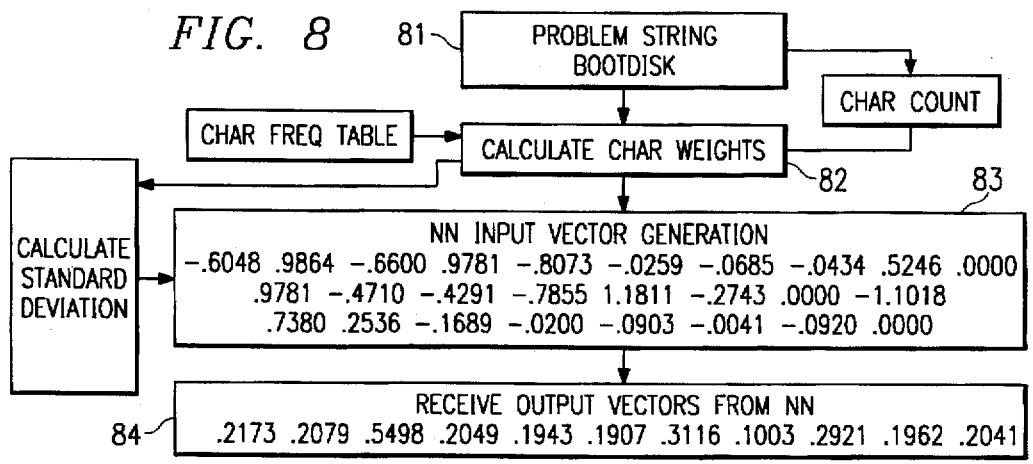
FIG. 8 illustrates an example of generating input for the recall step of FIG. 7.

FIG. 8 provides further detail of Step 77. In accordance with the above-described character preprocessing technique, step 82 assigns a value to each character of the problem string. In step 83, an input vector of character values is applied to neural network 15. In step 84, this pattern of values is matched by neural network 15, to generate a solution vector.

In step 78, the user receives an output value. In the example of this description, each output of neural network 15 represents an index to a part number. In some cases, the problem description may cause more than one output of neural network 15 to fire. Thus, an additional step, although not shown in FIG. 7, might be assigning priorities to multiple outputs.

In step 79, the output is matched to a part number in a table.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A method of providing input representing an alphanumeric problem description to a neural network, comprising the steps of:

receiving a word domain of words constructed from a character set;

counting the number of characters in said domain;

counting the number of each character in said domain;

dividing the number of each character by the total number of characters to obtain a character frequency value for each character; and providing an input value to a neural network for each character of a problem description, wherein said input value is derived from said character frequency value for each character.

2. The method of claim 1, and further comprising the step of filtering said word domain to distinguish high value words.

3. The method of claim 2, wherein said filtering step comprises comparing words of said word domain to a dictionary of words not to be used.

4. The method of claim 2, wherein said filtering step comprises comparing words of said word domain to a dictionary of words to be used.

5. The method of claim 1, wherein said step of determining an input value comprises removing character biases to obtain a scaled value for each character.

6. The method of claim 5, wherein said character biases are removed by multiplying the number of occurrences of a character in a problem description times its character frequency and subtracting the product from the total number of characters in the problem description.

7. The method of claim 5, wherein said character biases are removed by scaling said character biases and distributing said character biases around a zero value.

8. The method of claim 5, wherein said step of determining an input value further comprises normalizing said input data.

9. The method of claim 8, wherein said normalizing said input data includes dividing each of said scaled values by the standard deviation of all of said scaled values within the problem description.

10. A method of training a neural network to solve problems stated in alphanumeric form, comprising the steps of:

receiving a problem domain of words collected from a number of problem descriptions;

assigning each character of said problem domain a frequency value;

translating problem descriptions to input values, wherein each input value represents a character of said problem description, and wherein each input value is derived from said frequency values;

applying said input values to an input layer of a neural network; and adjusting weights of said neural network until each said problem description results in a desired output.

11. The method of claim 10, and further comprising the step of filtering said problem description to distinguish high value words.

12. The method of claim 11, wherein said filtering step comprises comparing words of said problem description to a dictionary of words not to be used.

13. The method of claim 11, wherein said filtering step comprises comparing words of said problem description to a dictionary of words to be used.

14. The method of claim 10, wherein said step of translating problem descriptions to input values comprises removing character biases to obtain a scaled value for each character.

15. The method of claim 10, wherein said character biases are removed by multiplying the number of occurrences of a character in a problem description times its character frequency and subtracting the product from the total number of characters in the problem description.

16. The method of claim 10, wherein said step of determining input values further comprises normalizing said input data.

17. A method of using a neural network to resolve textual problem descriptions, comprising the steps of:

receiving a textual problem description having characters;

assigning each said character in said problem description an input value, based on a frequency value derived from a domain of problem descriptions;

inputting said input values to a neural network; and using said neural network to match said input values to an output value.

18. The method of claim 17, wherein said step of assigning each character an input value comprises removing character biases to obtain a scaled value for each character.

19. The method of claim 18, wherein said character biases are removed by multiplying the number of occurrences of a character in a problem description times its character frequency and subtracting the product from the total number of characters in the problem description.

20. The method of claim 17, wherein said step of assigning each character an input value further comprises normalizing said input data.

21. The method of claim 20, wherein said normalizing said input data includes dividing each of said scaled values by the standard deviation of all of said scaled values within the problem description.

22. A neural network system for receiving and processing input data in text format, comprising:

a character preprocessor for receiving a problem description in text format and for translating said problem description to input values on a character by character basis, wherein said character preprocessor is programmed to store a frequency value for each character used by said problem description and to assign a frequency value to each character of said problem description; and a neural network for receiving said input values and for recalling similar input associated with a certain output.

23. The system of claim 22, wherein said character preprocessor is further programmed to remove character biases to obtain a scaled value for each character.

24. The system of claim 23, wherein said programming removes character biases by multiplying the number of occurrences of a character in a problem description times its character frequency and subtracting the product from the total number of characters in the problem description.

25. The system of claim 23, wherein said programming removes character biases by scaling them and distributing them around a zero value.

26. The system of claim 22, wherein said character preprocessor is further programmed to normalize said input data.

27. The system of claim 26, wherein said normalization is achieved by dividing each of said scaled values by the standard deviation of all of said scaled values within the problem description.

28. The system of claim 22, and further comprising a filter preprocessor for filtering said word domain to distinguish high value words.

29. The system of claim 22, further comprising a second neural network for correcting spelling of words of said problem description, wherein said neural network receives input values from said character preprocessor.

30. A system for resolving problem descriptions, comprising:

a character preprocessor for receiving a problem description in text format and for translating said problem description to input values on a character by character basis, wherein said character preprocessor is programmed to store a frequency value for each character used by said problem description and to assign a frequency value to each character of said problem description;

a neural network for receiving said input values and for recalling similar input associated with a certain output; and a user interface system for interactively receiving problem descriptions from a user and for providing problem solutions.

31. The system of claim 30, wherein said character preprocessor and said user interface system comprise a computer, an input means, and an output display, wherein said computer is programmed to perform functions of said character preprocessor and said user interface system.

* * * * *